United States Patent
Aota

(10) Patent No.: US 9,307,163 B2
(45) Date of Patent: Apr. 5, 2016

(54) IMAGING DEVICE AND IMAGING METHOD

(71) Applicant: Olympus Corporation, Shibuya-ku, Tokyo (JP)

(72) Inventor: Koji Aota, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/558,178

(22) Filed: Dec. 2, 2014

(65) Prior Publication Data

US 2015/0172529 A1 Jun. 18, 2015

(30) Foreign Application Priority Data

Dec. 16, 2013 (JP) ................. 2013-259054

(51) Int. Cl.
- *H04N 5/345* (2011.01)
- *H04N 5/235* (2006.01)
- *H04N 5/378* (2011.01)
- *H04N 5/232* (2006.01)
- *H04N 5/243* (2006.01)

(52) U.S. Cl.
CPC ......... *H04N 5/2357* (2013.01); *H04N 5/23245* (2013.01); *H04N 5/3456* (2013.01); *H04N 5/378* (2013.01); *H04N 5/243* (2013.01); *H04N 2209/042* (2013.01)

(58) Field of Classification Search
CPC .............. H04N 5/2357; H04N 5/3456; H04N 5/23245; H04N 5/378; H04N 2209/042; H04N 5/243
USPC ............. 348/226.1, 447, E5.11, 387.1, 390.1, 348/441
See application file for complete search history.

(56) References Cited

U.S. PATENT DOCUMENTS

| | | | | |
|---|---|---|---|---|
| 7,616,233 B2 * | 11/2009 | Steinberg | ............... | H04N 5/232 348/222.1 |
| 7,636,109 B2 | 12/2009 | Nakajima | | |
| 2011/0096193 A1* | 4/2011 | Egawa | ................... | H04N 5/235 348/226.1 |
| 2011/0221929 A1* | 9/2011 | Miyahara | ............... | G03B 7/093 348/226.1 |
| 2012/0032990 A1* | 2/2012 | Li | ........................ | G09G 3/3426 345/690 |
| 2014/0043502 A1* | 2/2014 | Ioka | ..................... | H04N 5/2357 348/226.1 |
| 2014/0354883 A1* | 12/2014 | Honda | ................ | H04N 5/2357 348/447 |

FOREIGN PATENT DOCUMENTS

| | | |
|---|---|---|
| JP | 06-105204 | 4/1994 |
| JP | 11-122513 | 4/1999 |

* cited by examiner

*Primary Examiner* — Hung Lam
(74) *Attorney, Agent, or Firm* — John C. Pokotylo; Straub & Pokotylo

(57) ABSTRACT

An imaging device of the present invention comprises an image sensor having a plurality of pixels made up of a first pixel group and a second pixel group, a flicker detection section for detecting bright states and dark states of all taken images based on a periodic flicker action of a light source contained in a subject from image output from the second pixel group, and a flicker correction calculation section 4 for, when light of brightness having bright states and dark states due to periodic flicker is incident, correcting brightness output gain corresponding to all pixels of the plurality of pixels corresponding to the first pixel group so that brightness output of taking images from the first pixel group becomes a standard brightness output.

8 Claims, 12 Drawing Sheets

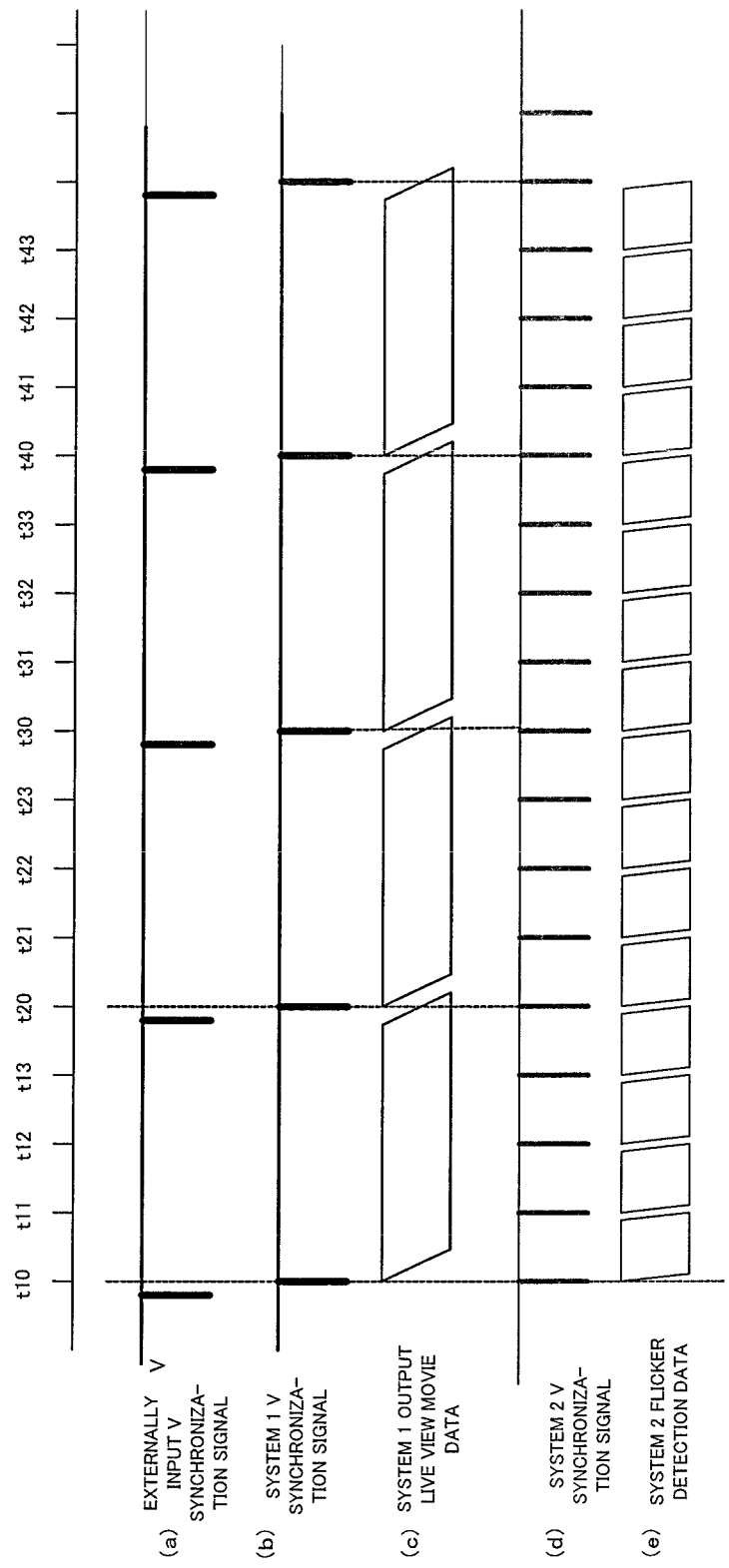

IMAGING DEVICE AND IMAGING METHOD

Benefit is claimed, under 35 U.S.C. §119, to the filing date of prior Japanese Patent Application No. 2013-259054 filed on Dec. 16, 2013. This application is expressly incorporated herein by reference. The scope of the present invention is not limited to any requirements of the specific embodiments described in the application.

BACKGROUND OF THE INVENTION

1. Field of the Invention

The present invention relates to an imaging device and imaging method that alleviate light source flicker, even in situations where a subject is illuminated by exterior lighting for which an amount of flicker varies periodically.

2. Description of the Related Art

At the time of shooting a movie indoors or performing Live view display, a light source such as a fluorescent lamp may vary in brightness periodically in synchronization with frequency of the mains power supply, and have an adverse effect on Live view display or movie shooting. This phenomenon is called light source flicker, and in a situation where frame rate at the time of shooting or at the time of Live view display is not synchronized to the frequency of variation in light source brightness there will be variation in brightness for every frame (called surface flicker), and bright lines are caused in images within the same frame for each space period (called line flicker).

In order to reduce the effect of the above-described light source flicker, various technologies have previously been proposed. Such technology is disclosed, for example, in Japanese patent laid-open No. Hei. 11-122513 (hereafter referred to as patent literature 1) and Japanese patent laid-open No. Hei. 6-105204 (hereafter referred to as patent literature 2). With these prior art technologies, at the time of correction for the effect of light source flicker, first image data is acquired for frames using an image sensor of a camera, frequency of light source flicker is detected based on time transformation of brightness output of the acquired image data, and brightness gain of each frame acquired from the image sensor is corrected based on this detected flicker frequency so that brightness of images in each frame becomes uniform.

Flicker of a light source used for an indoor light source fluctuates at 50 Hz or 60 Hz since it is based on the commercial power supply frequency. For example, with patent publication 1, flicker detection is carried out by operating at a frame frequency that is the same as or slower than the flicker frequency of the light source, and confirming vertical intensity distribution of a frame. This method can not carry out flicker detection and correction effectively in a situation where live view display or movie recording is carried out at a frame frequency that is the same as or slower than the flicker period of the light source.

SUMMARY OF THE INVENTION

An imaging device of a first aspect comprises an image sensor, having a plurality of pixels comprising a first pixel group and a second pixel group arranged in a two dimensional array, and a plurality of A/D converters for simultaneous and parallel conversion of output signals that have been respectively formed by pixels corresponding to the first pixel group and the second pixel group to respective digital signals, an image signal readout section for respectively independently reading out image signals from pixels corresponding to the first pixel group and the second pixel group of the image sensor, a flicker detection section for subjecting a subject image that has been formed on the image sensor to photoelectric conversion based on a periodic flicker action of the light source included in the subject, and detecting flicker period of the light source by detecting bright states and dark states of an entire taken image from image output corresponding to pixels corresponding to the second pixel group, and a flicker correction section for, when, in the flicker detection section, an image that has been acquired using pixels corresponding to the second pixel group has light of a bright state and a dark state incident as a result of periodic flicker, making brightness output of a taken image using the first pixel group arranged in correspondence with the second pixel group become a standard brightness output, and correcting brightness output gain corresponding to each pixel of a plurality of pixels corresponding to the first pixel group.

An imaging method of a second aspect comprises a step of respectively independently reading out image signals from pixels corresponding to a first pixel group and a second pixel group, from an image sensor having a plurality of pixels comprising the first pixel group and the second pixel group arranged in a two dimensional array, and a plurality of A/D converters for simultaneous and parallel conversion of output signals that have been respectively formed by pixels corresponding to the first pixel group and the second pixel group to respective digital signals, a flicker detection step of subjecting a subject image that has been formed on the image sensor to photoelectric conversion based on a periodic flicker action of a light source included in the subject, and detecting flicker period of the light source by detecting bright states and dark states of an entire taken image from image output corresponding to pixels corresponding to the second pixel group, and a flicker correction step of, when, in the flicker detection step, an image that has been acquired using pixels corresponding to the second pixel group has light of a bright state and a dark state incident as a result of periodic flicker, making brightness output of a taken image using the first pixel group arranged in correspondence with the second pixel group as a standard brightness output, and correcting brightness output gain corresponding to each pixel of a plurality of pixels corresponding to the first pixel group.

BRIEF DESCRIPTION OF THE DRAWINGS

FIG. 6 is a timing chart showing readout timing for a first system and a second system of an image sensor, for a camera of one embodiment of the present invention.

DETAILED DESCRIPTION OF THE PREFERRED EMBODIMENTS

Preferred embodiments using a camera as one example to which the present invention has been applied will be described in the following in accordance with the drawings. With one aspect of the present invention, there is provided an imaging device and an imaging method capable of canceling flicker in high-speed camera mode, even in a portable device such as a digital camera.

A camera of a preferred one embodiment of the present invention is a digital camera having an imaging section such as an image sensor. This imaging section converts a subject image that has been formed by a photographing lens into image data. Output of an image sensor within the imaging section is made up of a two system, namely system 1 for outputting data of a first pixel group, and system 2 for outputting data of a second pixel group, and it is possible to independently set respective frame rates for read out (in other words, it is possible to respectively independently set an electronic shutter speed). As camera operation, at the time of live view display or movie shooting, flicker is detected using image data that has been read out at a high frame rate, and a gain is calculated in order to give a uniform brightness in accordance with the result of this detection. Using this calculated frame, correction of flicker is carried out for image data that has been read out at a low frame rate. Based on this corrected image data, live view display of a subject is performed on a display section arranged on a rear surface of the camera body, or in movie mode, image data of a movie that has been acquired in response to operation of a movie button etc. is stored.

Figure 1:
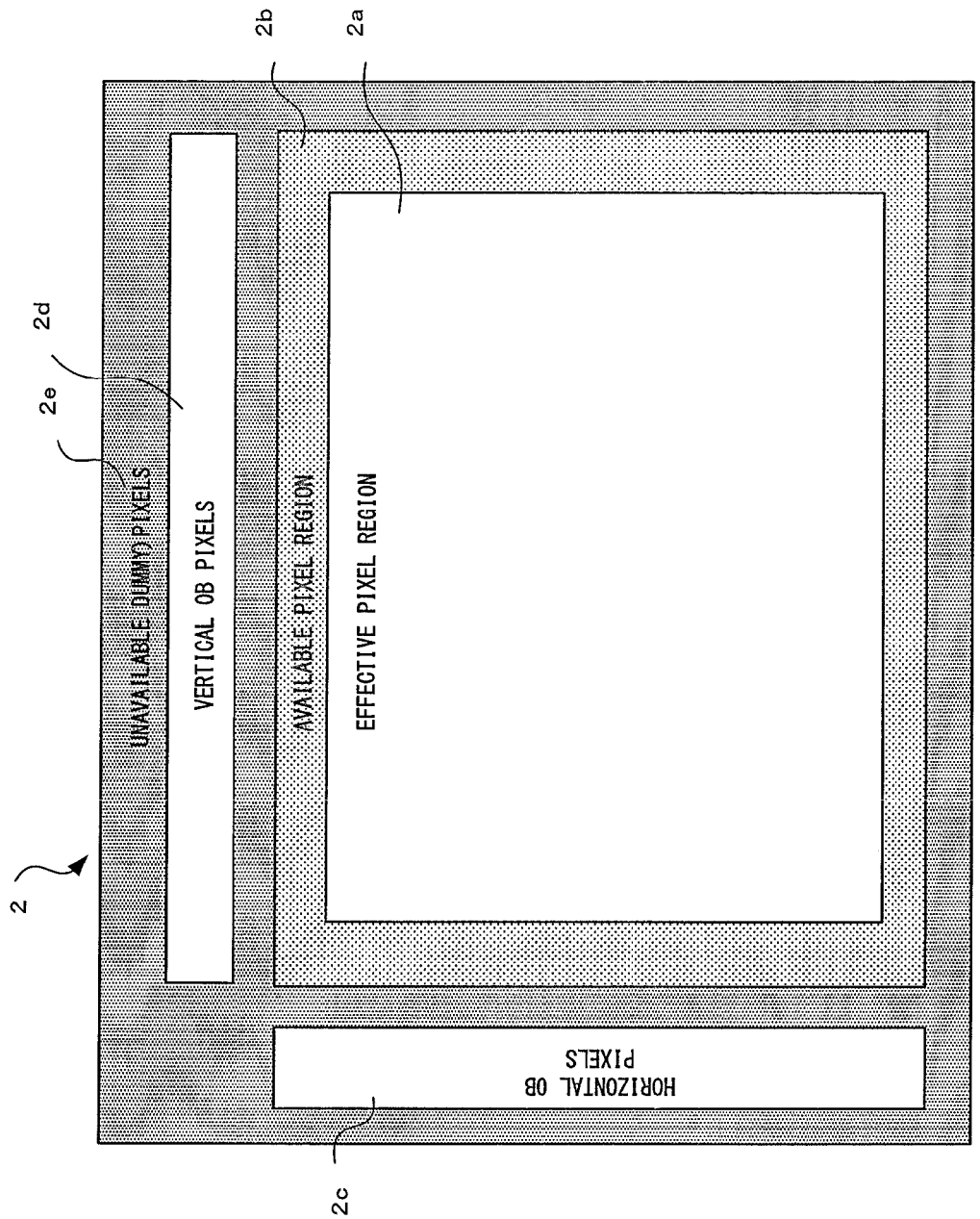
FIG. 1 is a plan view showing a pixel structure of an image sensor of one embodiment of the present invention.
Figure 2:
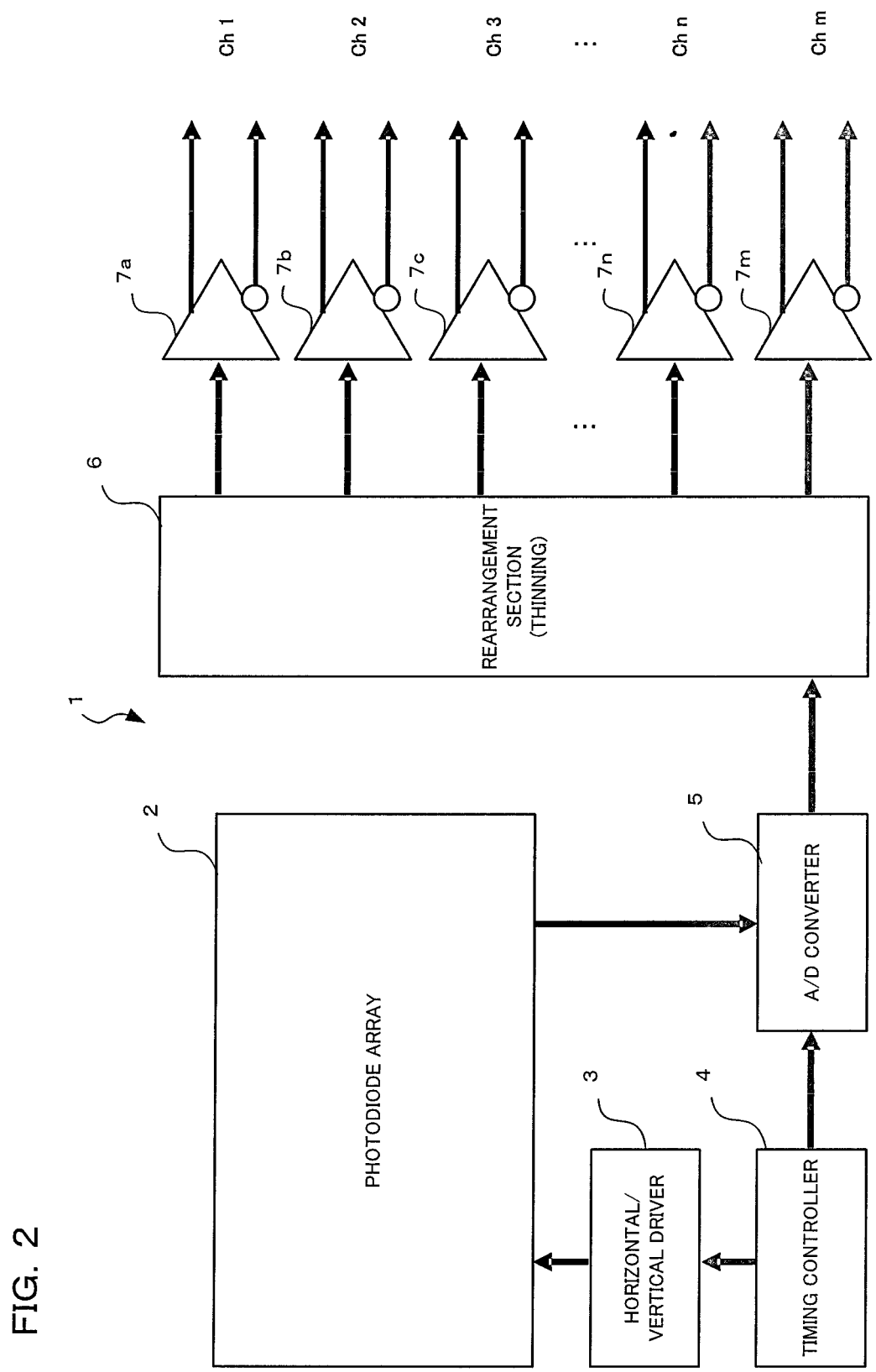
FIG. 2 is a block diagram showing the internal circuit structure of an image sensor of a camera of one embodiment of the present invention.

FIG. 1 is a plan view showing the pixel structure of an image sensor of a camera of one embodiment of the present invention, and FIG. 2 is a block diagram showing the internal circuit structure of the image sensor.

In FIG. 1, a pixel structure of a photodiode array 2 (refer to FIG. 2) of an image sensor 1 is shown. Here, available pixels 2b are pixels of an available pixel region for acquiring image data for a subject image. Effective pixels 2a are pixels of a pixel region there are actually used, within the available pixel region. Also, horizontal OB (optical black) pixels 2c that run in the vertical direction and vertical OB pixels 2d that run in the horizontal direction are arranged outside the available pixel region constituted by the available pixels 2b.

The horizontal OB pixels 2c and the vertical OB pixels 2d are pixels that have light receiving services of the photodiodes shielded. As a result, a signal corresponding to dark current under total darkness is output, without forming a subject image using the photographing lens 11 (refer to FIG. 4). OB correction is carried out using dark current output from the OB pixels. A region outside the available pixels 2b, horizontal OB pixels 2c and vertical OB pixels 2d is ineffective pixels (dummy pixels) that are not reflected in image data for a subject image.

FIG. 2 shows internal circuitry of the image sensor 1 for a digital camera. The image sensor 1 internally comprises a photodiode array 2, horizontal and vertical drivers 3, a timing controller 4, an A/D converter 5, a rearrangement section 6, and buffer amps 7a-7m. The configuration of pixels of the photodiode array 2 is as was described using FIG. 1.

The horizontal and vertical drivers 3 read out image data of the available pixels 2b, horizontal OB pixels 2c, vertical OB pixels 2d and ineffective pixels 2e etc. within the photodiode array 2, in accordance with timing signals from the timing controller 4.

The A/D converter 5 converts subjects image data that has been read out from the photodiode array 2 to AD conversion in accordance with timing signals from the timing controller 4, to give a digital signal. Image data that has been made into a digital signal is then output to the rearrangement section 6. The rearrangement section 6 then carries out appropriate thinning of image data of the available pixels 2b that has been read out from within the photodiode array 2, in accordance with each operating mode of the camera, such as live view display, still picture shooting movie shooting etc., and outputs to the buffer amps 7a-7m.

In this way, an image sensor 1 of this embodiment is configured. Generally, with a digital camera, the way in which pixel outputs of the image sensor are utilized at the time of image generation will differ at the time of all-pixel still picture shooting, movie shooting, and image acquisition for live view display. Specifically, at the time of all-pixel still picture shooting, all available pixels are used for storage. On the other hand, at the time of image acquisition for live view display, movie shooting, or high-speed camera operation, an image size corresponding to a display device, such as a rear surface liquid crystal or EVF of a camera, or TV output etc. is cropped from the available pixel region of the image sensor, or read out by thinning etc., and image data of pixels that is not read out is not used With the camera of this embodiment, as stated above, at the time of all-pixel still picture shooting all of the available pixels 2b are used for storage. On the other hand, at the time of live view display, movie recording, or a high-speed camera operation, and image size conforming to a display device, such as a display section like a rear surface liquid crystal panel, an EVF (electronic viewfinder), TV or the like, is read out from the effective pixel region by thinning (or clipping). Here, data of pixels that have not been read out due to the thinning or clipping are not used.

Concentrating on data output from the image sensor 1, at the time of all-pixel still picture shooting, data is output using all of output channels Ch1-Chm possessed by the image sensor 1. On the other hand, at the time of live view display, movie recording or high-speed camera operation etc., since a zone for which data is output is small compared to an all-pixel still picture, output of image data is carried out using only some of the output channels possessed by the image sensor. For example, as an example where only some of the output channels are used, there is a configuration where data output is carried out using only channel 1 (Ch1) and channel 2 (Ch2) of the image sensor 1.

The image sensor 1 has separate exposure control for a pixel circuit of each channel, and it is possible to make a frame rate (electronic shutter speed) at the time of reading out Channel 1 (Ch1) and a frame rate (electronic shutter speed) when reading out channel 2 (Ch2) different. Detailed structure and operation of the pixel circuits of the image sensor 1 will be described later.

Accordingly, with this embodiment, at the time of all-pixel still picture shooting, output is performed using all output channels (Ch1-Chm in FIG. 2) possessed by the image sensor 1. On the other hand, at the time of live view display, movie recording and high-speed camera operation, since a zone for which data is output is small compared to at the time of all-pixel still picture shooting, data is output using only some of the output channels possessed by the image sensor 1 (for example, only Ch1 and Ch2 in FIG. 2). With this embodiment, the image sensor 1 functions as an image sensor having a plurality of pixels comprising a first pixel group and a second pixel group arranged in a two dimensional array, and a plurality of A/D converters for simultaneous and parallel conversion of output signals that have been respectively formed by pixels corresponding to the first pixel group and the second pixel group to respective digital signals.

With this embodiment, output of the image sensor 1 is divided into two systems which are driven to carry out a correction operation, so as to perform optimum flicker correction at the time of live view display, movie recording, and high-speed camera operation.

Specifically, when shooting an all-pixel still picture, both system 1 (for example, Ch1 and Ch2) and system 2 (for example, Chn and Chm) are used to carry out data transfer. On the other hand, at the time of live view display, movie shooting, or high-speed camera operation, image data of a main movie is acquired from system 1. Image data for flicker correction is then acquired from system 2. Further, for a movie, an image that has had flicker corrected in real time is acquired and subjected to live view display. The acquired flicker corrected image is then stored as image data for a movie. Image data from system 2 is also used in AE (auto exposure) and AF (auto focus). With this embodiment, the image sensor 1 has an image signal readout section (system 1 and system 2) for respectively independently reading out image signals from pixels corresponding to the first pixel group and the second pixel group of the image sensor.

Also, output of the image sensor 1 within the imaging section of this embodiment is provided with system 1 for outputting data of the first pixel group and system 2 for outputting data of the second pixel group, as was described previously. Output of these two systems can be independently set to respective read frame rates. In other words, it is possible to respectively independently set electronic shutter speed.

At the time of live view display, movie shooting and high-speed camera operation, flicker frequency is detected from images having surface flicker using image data of system 2 that has been read out at a high frame rate. Correction of light source flicker for a live view image or movie image that was acquired using system 1 is carried out in real time using this detected flicker frequency.

Figure 3:
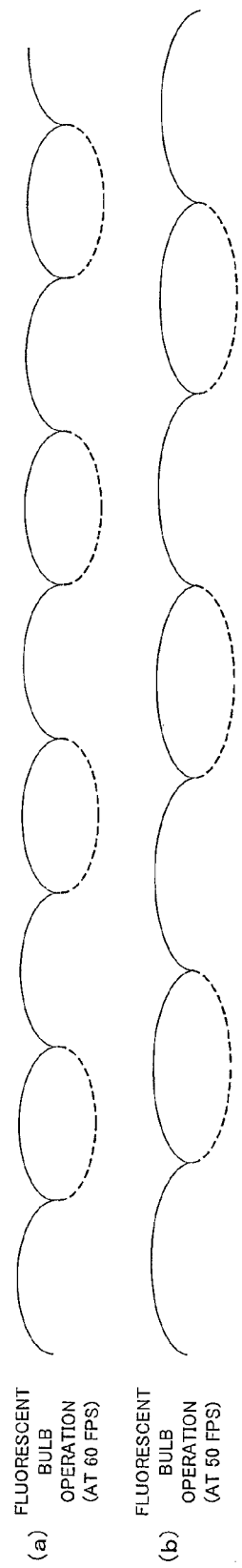
FIG. 3 is a drawing showing a relationship between electric light flicker period and frame rate, for a camera of one embodiment of the present invention.

Next change in a taken image at the time of high-speed shooting (including live view display) that is subject to light source flicker will be described using FIG. 3. FIG. 3 is a drawing showing a relationship between flicker period of illumination, being a light source, and frame rate.

(a) at the upper part of FIG. 3 is a waveform diagram showing change in brightness of a fluorescent lamp which is a light source that is lit at a commercial frequency of 60 Hz. Part (b) that is shown next is a waveform diagram showing brightness variation for a fluorescent lamp which is lit at a commercial frequency of 50 Hz. Applied voltage at the commercial frequency that is applied to the fluorescent lamp has a period that corresponds to the commercial frequency, and has positive and negative signs. On the other hand, brightness of a fluorescent lamp changes with a relationship that is proportional to absolute value of the applied voltage. Accordingly, as shown by the solid line in (a) and (b), in the case of driving the lamp at 60 Hz, for example, light and dark are repeated at a frequency that is twice that (120 Hz).

(c)-(e) shown in the third to fifth parts of FIG. 3 show brightness variation for each frame image acquired by the image sensor 1 in accordance with flicker variation of the fluorescent lamp. (c) shows brightness variation in the case of a frame rates at the time of shooting (including at the time of live view display) of 480 fps (frames per second). (d) shows brightness variation in the case of a frame rate of 120 fps. (e) shows brightness variation in the case of a frame rate of 60 fps. In each diagram, under conditions of the respective frame rates, in the case where applied voltage of the fluorescent lamp is 60 Hz or 50 Hz, brightness variation for each case shown in respective upper and lower rows.

As shown in (c)-(e) in FIG. 3, as the image sensor 1 performs exposure operation at a frame rate of a faster frequency than the flicker period of the light source, surface flicker becomes more dominant than line flicker. Here, surface flicker is a phenomenon whereby overall brightness within each taken frame image varies periodically for every frame. Also, line flicker is a phenomenon whereby brightness distribution of light and dark occurs in an image within a frame.

That fact that the type of flicker that is dominant differs depending on frame rate at which image data is read out from the image sensor 1 is based on the following actions. (1) an image acquired in each frame is formed by the image sensor 1 accumulating a subject image for each frame period. (2) As a result, if the frame rate period is short compared to the light source flicker period (that is, if the frame rate is high), brightness distribution within each frame becomes almost uniform, and there is little brightness variation with position. Accordingly, surface flicker becomes dominant.

Also, regarding line flicker, under conditions where flicker frequency of the light source and the frame rate are synchronized (for example, the frame rate of 120 fps and fluorescent lamp drive frequency of 60 Hz in (e) in FIG. 3), if brightness distribution of a frame image is observed, positions where there are peaks of light and dark are at substantially the same positions in the image. On the other hand, if the flicker frequency of the light source and the frame rate are not synchronized, brightness distribution of an image that has been acquired in each frame is such that positions where peaks of light and dark arise moving for every frame.

Correction of line flicker in the case of a low-speed frame rate is generally carried out by reading out an image at a specified frame rate, and detecting whether or not there is temporal variation in brightness distribution of this read-out frame image. Drive frequency of the light source (generally, the commercial frequency) is detected based on the result of the temporal variation detection, and line flicker correction is carried out in accordance with position of the image, so that brightness of the frame image becomes uniform, in accordance with the result of this detection.

Correction of surface flicker at the time of a high frame rate makes brightness distribution of each frame image due to light source flicker uniform. Therefore, for brightness of some line outputs of each frame images, flicker frequency of the light source is detected from brightness variation of each frame. Surface flicker correction is carried out using this flicker frequency so as to make brightness of the frame images uniform.

With regard to still picture digital cameras, high-speed cameras for continuously shooting still images at a high frame rate are known. As a frame rate for a high-speed camera, for example, slow-motion storage of various sports is possible at 500 fps (frames per second).

Also, flicker of a fluorescent lamp is predominantly twice the commercial frequency. With this embodiment, therefore, in a light source environment that is driven at the commercial frequency (50 Hz/60 Hz), flicker at the time of live view display or at the time of movie recording etc. is canceled in real time.

Figure 4:
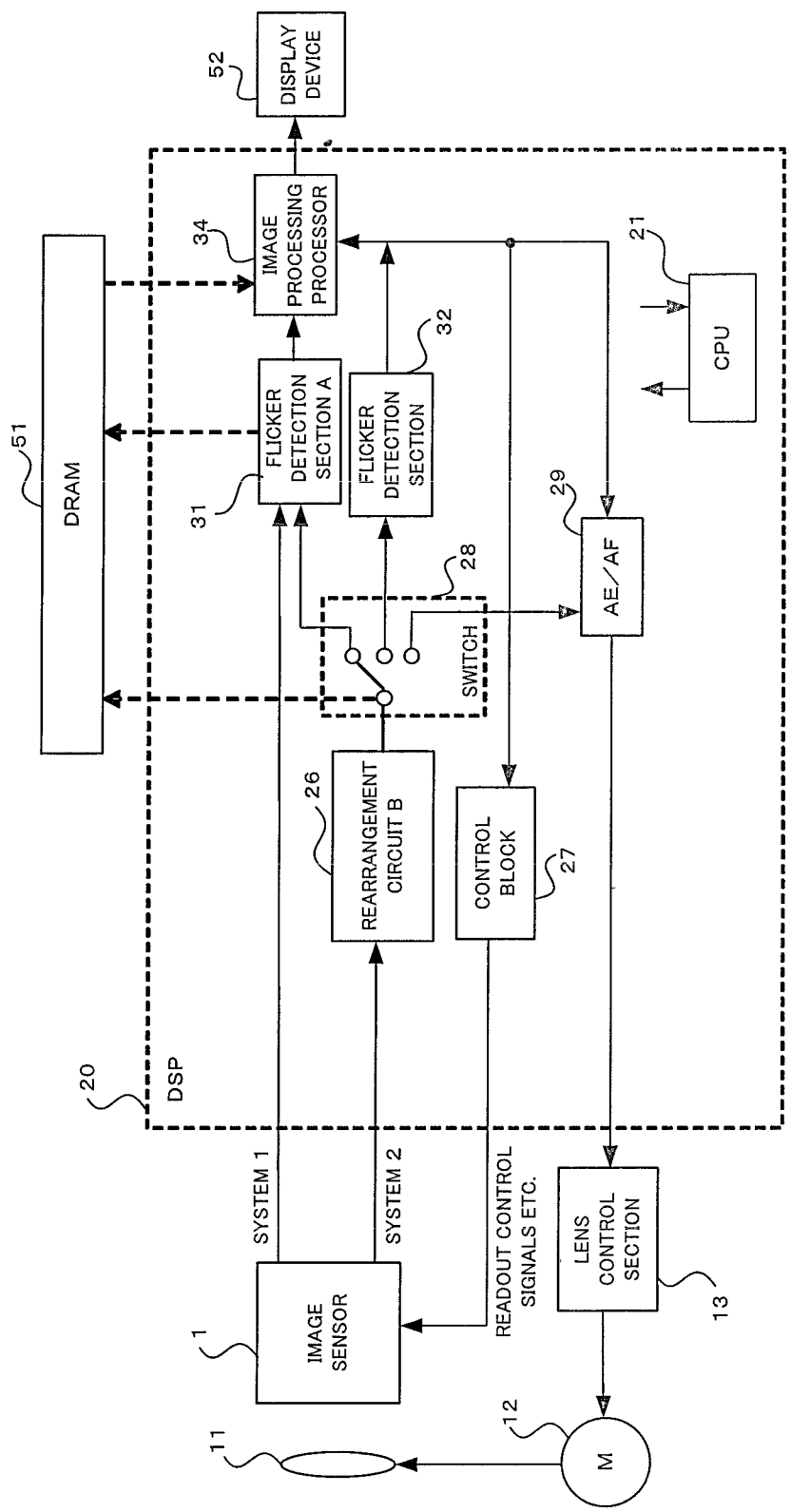
FIG. 4 is a block diagram showing a schematic circuit for correcting real time flicker, for a camera of one embodiment of the present invention.

Next, a circuit structure for correcting flicker in real time will be described using FIG. 4. The previously described image sensor 1 is arranged at a position close to where a subject image is formed by the photographing lens 11. The photographing lens is moved in an optical axis direction by a motor 12 that is driven in accordance with control signals from a lens control section 13.

Image data of the image sensor 1 is output by the system 1 and system 2 to a DSP (digital signal processor) 20. Specifically, image data of the image sensor 1 is output via system 1 to a rearrangement circuit A 31 within the DSP 20, and output via system 2 to a rearrangement circuit B 26 within the DSP 20. Also, the image sensor 1 is input with signals such as control signals read-out from a control block 27 of the DSP 20. Readout frequencies (frame rates) for reading out from system 1 and system 2 can be set to respectively different frequencies at the time of movie shooting and at the time of live view display. For example, there may be cases where respective frame rates at the time of movie shooting are set to faster frame rates than the respective frame rates at the time of live view display. In this case, it is possible to suppress power consumption of the imaging device in operation at the time of live view display where movie recording is not carried out.

The DSP 20 comprises a rearrangement circuit B 26, the control block 27, a switch 28, AE/AF 29, a rearrangement circuit A 31, a flicker detection section 32, a level setting section 33, an image processing processor 34, and a CPU (Central Processing Unit) 21. The rearrangement circuit B 26 carries out rearrangement processing for image data that has been read out from read-out system 2 of the image sensor 1, at high speed. This rearrangement processing is for carrying out processing to thin and rearrange read-out images that have been read out for every line from system 2.

The switch 28 performs switching to output image data that has been output from the rearrangement circuit B 26 to either the AE/AF (auto exposure/auto focus) 29, which will be described later, the rearrangement circuit A 31 or the flicker detection section 32. The rearrangement circuit B 26 also has a pass-through function. Using this pass-through function, it is possible to temporarily store image data output of the rearrangement circuit B 26 in a DRAM 51, separately from output to the previously described switch circuit 28, without carrying out rearrangement processing on image data that has been read out from the image sensor 1 at high speed.

The AE/AF 29 is input with image data of system 2 that has been input via the switch 28 or image data of system 1 that has been input from the rearrangement circuit A 31, and calculates a brightness value for exposure control. Shutter speed of an electronic shutter of the image sensor 1 is controlled based on this calculated brightness value. The AE/AF 29 also extracts high frequency components at a space frequency for image data from system 1 or system 2, and calculates an evaluation value for a contrast signal. The lens control section 13 then carries out focus adjustment of the photographing lens 11 such that the evaluation value of the contrast signal becomes a peak.

The rearrangement circuit A 31 is input with image data of system 1 from the image sensor 1 and image data from system 2 from the switch 28, carries out rearrangement of the image data, and outputs to the image processing processor 34. This rearrangement circuit A 31 uses image data from system 1 at the time of live view display or at the time of movie shooting, and outputs image data of an image size corresponding to the display device to the image processing processor 34. Also, at the time of all-pixel still picture shooting the rearrangement circuit A 31 uses image data from system 1 and system 2, rearranges image data made up of all pixels, and outputs to the image processing processor 34. It is also possible to temporarily store output of the rearrangement circuit A 31 in the DRAM 51, separately from output to the image processing processor 34.

The flicker detection section 32 is input with image data of system 2 that has been read out at a high frame rate, and detects variation in average brightness for every frame of this image output to detect frame period for flicker brightness variation due to surface flicker, and flicker frequency. Also, frame rate setting for reading out the above-described system 2 is change to detect variation in average brightness of every line of this image output. By detecting variation in this average brightness, flicker frequency due to line flicker in which light and dark occurs within each frame of the image data acquired from system 2 is identified. Detailed structure of the flicker detection section 32 will be described later using FIG. 4. This flicker detection section 32 functions as a flicker detection section for performing photoelectric conversion on a subject image that includes periodic light source flicker contained in a subject, using the image sensor (image sensor 1), for detecting a flicker period of the light source by detecting bright states and dark states of an overall taken image from image output corresponding to pixels corresponding to the second pixel group.

The DRAM 51 is a volatile rewritable memory, and is input with, and stores, image data etc. output from the rearrangement circuit B 26 and the rearrangement circuit A 31. The DRAM 51 also outputs stored image data etc. to the image processing processor 34.

The image processing processor 34 is input with image data that has been output from the rearrangement circuit A 31, and applies flicker correction to image data based on detection results from the flicker detection section 32. Also, various image processing such as OB (optical black) correction, gamma correction, image compression etc., and the generation of image data for live view display, image data for still picture storage, image data for movie recording, image data for playback display etc. are carried out.

The display device 52 is a display device such as a liquid crystal panel or an organic EL. The display device 52 is input with image data such as image data for live view display or image data for playback display that has been output from the image processing processor 34, and carries out image display such as live view display and playback display.

The CPU 21 is input with data etc. from each section within the DSP 20, and outputs control signals to each section to carry out overall control of the DSP 20.

Figure 5:
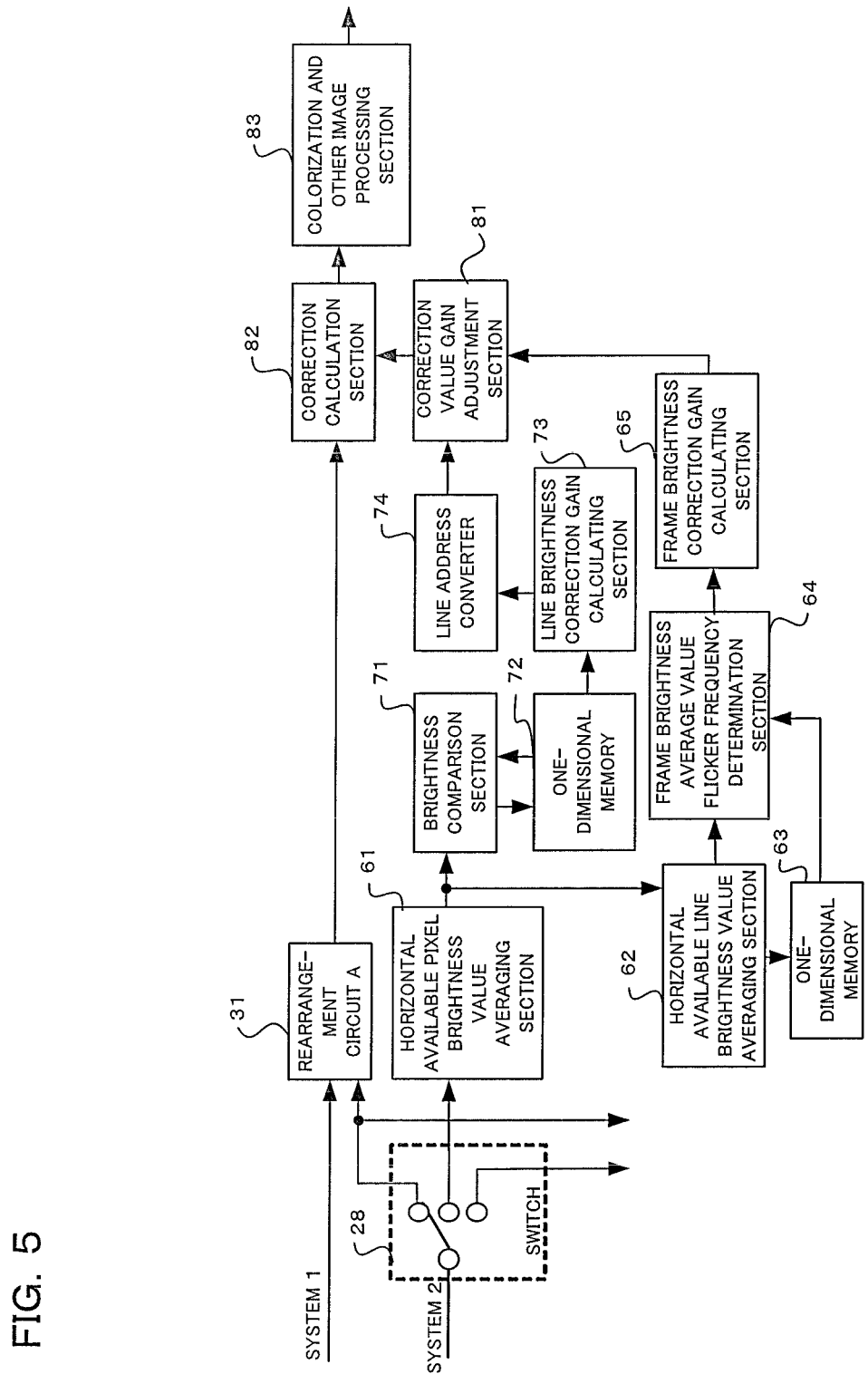
FIG. 5 is a block diagram showing the details of flicker detection and flicker correction processing circuitry, for a camera of one embodiment of the present invention.
Figure 7A:
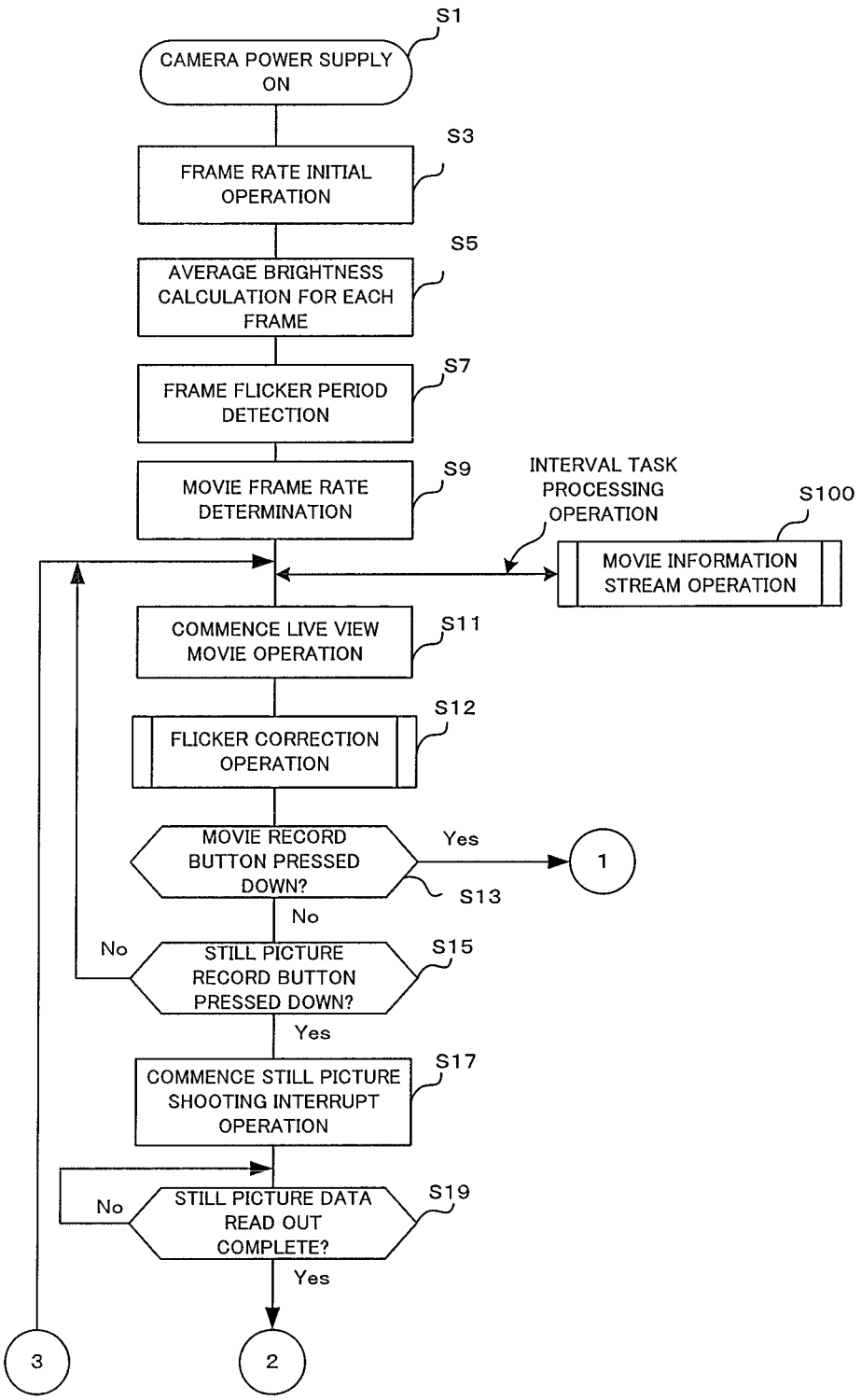
FIG. 7A and FIG. 7B are flowcharts showing operation of the camera of one embodiment of the present invention.
Figure 7B:
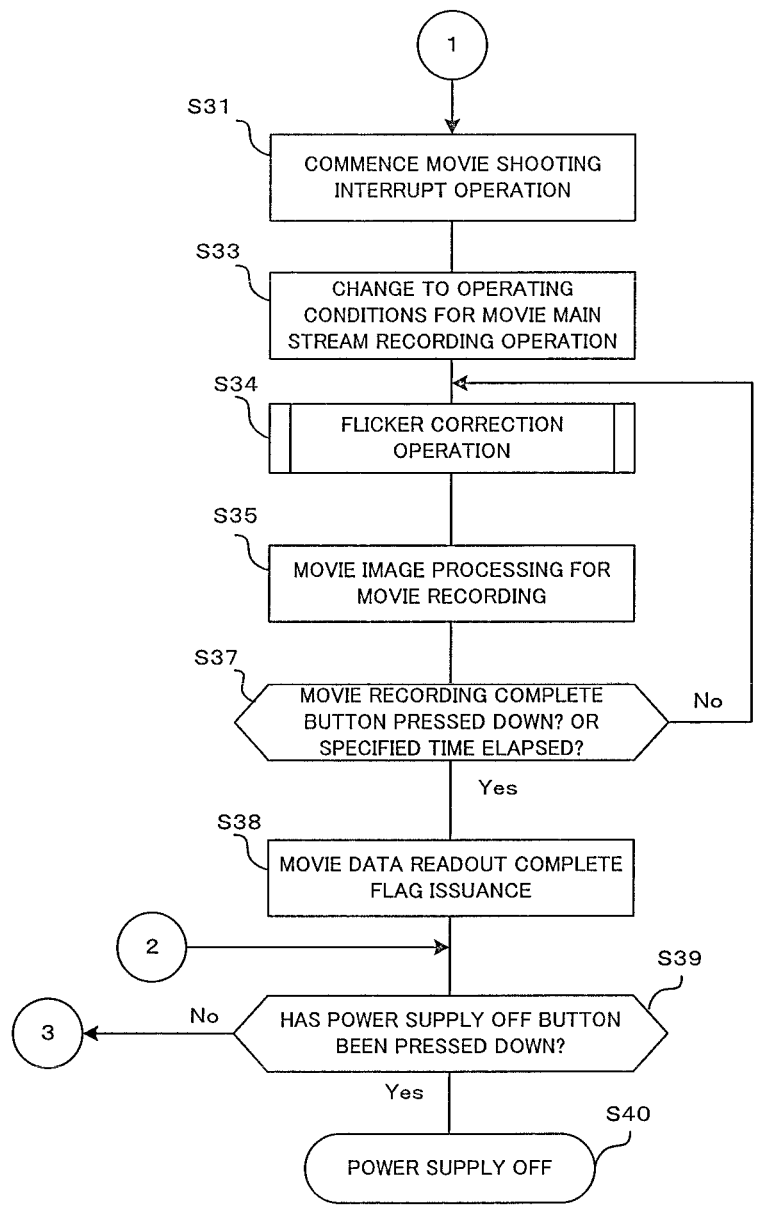

Next, the detailed structure of the flicker detection section 32 shown in FIG. 4 will be described using FIG. 5. Besides the flicker detection section 32, the rearrangement circuit A 31 and switch 28, that constitute part of the image processing processor 34 that also relate to flicker detection, are also shown in FIG. 5.

In this embodiment, an all-pixel still picture is acquired based on output of both system 1 and system 2 of the image sensor 1. On the other hand, at the time of acquiring a movie or live view display image, image output that is output of system 1 is acquired, and flicker frequency and correction value are detected from brightness information (AE), contrast information (AF), and temporal variation in brightness information, based on image output from system 2.

A horizontal available pixel brightness value averaging section 61 is input with image data of system 2 via the switch 28. This horizontal available pixel brightness value averaging section 61 calculates an average brightness for every horizontal line of image data, and outputs to a horizontal available line brightness value averaging section 62 and a brightness comparison section 71.

The horizontal available line brightness value averaging section 62 calculates an average brightness of all frames using a plurality of average brightnesses for horizontal lines that have been calculated by the horizontal available pixel brightness value averaging section 61, and outputs to a primary storage memory 63 and a frame brightness average value flicker period determination section 64.

The primary storage memory 63 stores an average value for a single frame that has been acquired by the horizontal available line brightness value averaging section 62. The frame brightness average value flicker period determination section 64 detects flicker period using an average value for a single frame that has been stored in the primary storage memory 63 (previous value), and an average value for a single frame that has been calculated by the horizontal available line brightness value averaging section 62 (current value). Information of this detected flicker period is then output to a frame brightness correction gain calculating section 65. Average values for a sufficient number of frames (for example 3-4 frames or more) to determine flicker period are stored in the primary storage memory 63. In the case of reading out output of system 2 of the image sensor 1 at 480 fps, as in (c) shown in FIG. 3, if there are 16 frames as a frame period for average brightness of each acquired frame, it is possible to identify the flicker period of the light source (50 Hz or 60 Hz).

The frame brightness correction gain calculating section 65 calculates an inter frame brightness correction gain in conformity with timing of flicker period that has been detected by the frame brightness average value flicker period determination section 64. Specifically, in the case where surface flicker occurs, a brightness correction gain is calculated in order to make average brightness of each frame uniform, and this calculated brightness correction gain is output to a correction value gain adjustment section 81.

The brightness comparison section 71 detects a maximum brightness value (including a MAX brightness address) and a minimum brightness value (including a min brightness address) based on horizontal line average brightness that was calculated by the horizontal available pixel brightness value averaging section 61. A primary storage memory 72 temporary stores a brightness average value maximum brightness value and minimum brightness value for respective lines based on detection results of the brightness comparison section 71.

The brightness comparison section 71 then compares the maximum brightness value and minimum brightness value stored in the primary storage memory 72 with brightness average values for each line that have been output from the horizontal available pixel brightness value averaging section 61, and updates the maximum brightness value or the minimum brightness value. The primary storage memory 72 outputs a brightness average value, maximum brightness value (including a MAX brightness address) and a minimum brightness value (including a min brightness address) for each line to a line brightness correction gain calculating section 73.

The line brightness correction gain calculating section 73 calculates a gain amount for correcting brightness flicker due to line flicker. Specifically, a required gain amount in the case of uniformly correcting the brightness of each line in order to remove the effects of line flicker occurring in each line is calculated using the maximum brightness value and minimum brightness value stored in the primary storage memory 72, and the average brightness value for each line. This calculated gain amount is output to a line address conversion section 74.

The line address conversion section 74 converts a line that has been read out in real time by system 2 to which line of a stored image that has been read out by system 1 it corresponds to. As was described previously, image data from system 2 is read out at a high frame rate. A correction gain amount for correcting line flicker is therefore calculated by the line brightness correction gain calculating section 73. Line flicker of image data from system 1 is corrected using this calculated correction gain amount. At this time, in order to correct between images of differing frame rates and read out image data size (line number), the line address conversion section 74 carries out line address conversion so that pixel positions (line positions) of image data from system 1 and pixel positions (line positions) of image data from system 2 appropriately match. Conversion results from the line address conversion section 74 are output to the correction value gain adjustment section 81.

The correction value gain adjustment section 81 is input with flicker period of line flicker from the line address conversion section 74 and brightness correction amount within a line of each frame image etc. in the case where line flicker is occurring. Also, in the case where surface flicker is occurring, the correction value gain adjustment section 81 is input with flicker period of surface flicker from the frame brightness correction gain calculating section 65 and flicker brightness correction gain amount etc. The correction value gain adjustment section 81 then outputs a gain correction amount etc. for correcting image data from system 1 to the correction calculation section 82.

For example in a case where image size for storage read out from system 1 is an integer multiple of two or greater than a flicker detection image size read out from system 2, brightness correction due to flicker causes excessive correction. The reason for this is that the "brightness correction gain amount for an arbitrary single arbitrary line that has been read out by system 2" that was calculated by the line brightness correction gain calculating section 73 is reflected directly onto lines of system 1 which are an integer multiple of two or greater in number. Therefore, the line flicker flicker period of the line address conversion section 74 and brightness correction amount etc. within lines in each frame image are input, and correction value for brightness correction gain is fine-tuned for each line that has been read out by system 1 and output to the correction calculation section 82. By using both output of the frame brightness correction gain calculating section 65 and output of the line address conversion section 74, it is possible to fine-tune the correction gain value sensitively for surface flicker.

The correction calculation section 82 carries out flicker correction on image data of system 1 based on output from the correction value gain adjustment section 81. The correction calculation section 82 then outputs the image data of system 1 that has been subjected to flicker correction to a colorization and other image processing section 83. The colorization and other image processing section 83 carries out image processing such as colorization image processing on the image data that has been subjected to flicker correction processing.

The correction calculation section 82 etc. reduce brightness output of an image taken using the first pixel group arranged corresponding to the second pixel group, when, in the flicker detection section, an image that has been acquired using pixels corresponding to the second pixel group has a bright state light of periodically flickering light. On the other hand, the correction calculation section 82 etc. increase brightness output of an image taken using the first pixel group arranged corresponding to the second pixel group, when an image that has been acquired using pixels corresponding to the second pixel group has light of brightness of a dark state incident. By carrying out this type of brightness correction calculation, the correction calculation section 82 functions as a flicker correction section for correcting brightness output gain corresponding to each pixel of a plurality of pixels corresponding to the first pixel group.

With one example of this embodiment, a value that is average brightness output of brightness variation due to flicker is made a correction target value for correction amount of brightness output gain by the correction calculation section 82 etc. However, correction amount for brightness output gain is not limited to this, and it is also possible, for example, to perform correction so as to increase brightness output of an image taken using the first pixel group arranged corresponding to the second pixel group based on a brightness output of a bright state. It is also possible, conversely, to make brightness output a reference for brightness output of a dark state, and to perform correction so as to reduce brightness output of an image taken using the first pixel group arranged corresponding to the second pixel group.

A circuit for flicker detection in this embodiment is provided with the horizontal available pixel brightness value averaging section 61 for obtaining average brightness value for every horizontal line, for image data from system 2 for reading out at a high frame rate. Further, detection of surface flicker and calculation of correction gain amount are carried out by the horizontal available line brightness value averaging section 62 that is input with output of the horizontal available pixel brightness value averaging section 61, the horizontal available line brightness value averaging section 62, primary storage memory 63, frame brightness average value flicker period determination section 64 and frame brightness correction gain calculating section 65. Also, detection of line flicker and calculation of correction gain amount are carried out by the brightness comparison section 71 which is input with average brightness values for every horizontal line, the primary storage memory 72, line brightness correction gain calculating section 73, and line address conversion section 74. Flicker correction for image data from system 1 is carried out by the correction value gain adjustment section 81, which is input with detection results for surface flicker and line flicker, and the correction calculation section 82. Image data with the effects of flicker removed by the correction value gain adjustment section 81 and the correction calculation section 82 is then generated, and the image data that has been subjected to flicker correction is output.

Also, an image signal readout section of the image sensor 1 reads out image signals of the second pixel group from system 2, within a readout period for image signals of one frame of the first pixel group from system 1. The flicker detection section 34 (each of the sections from the horizontal available pixel brightness value averaging section 61 to the line address conversion section 74) detects flicker frequency of the light source based on the number of flicker frames occurring periodically, using image signals of the second pixel group. The flicker correction section (correction calculation section 82 etc.) performs gain correction on image signals of the first pixel group that have been read out within a period that includes the readout period of the second pixel group from system 2.

Also, the flicker detection section (each of the sections from the horizontal available pixel brightness value averaging section 61 to the frame brightness average value flicker period determination section 64) detects flicker frequency of the light source based on number of flicker frames occurring periodically. The flicker detection section then determines whether or not surface flicker is occurring with an image acquired from the first pixel group by comparing readout period of an image made up of the first pixel group from system 1 and the detected flicker frequency of the light source. The flicker correction section (correction calculation section 82) uniformly carries out gain correction for brightness output of image signals that have been read out from the first pixel group in a time that corresponds to an image that has been read out from system 2, when it has been determined, using determination of the flicker detection section, that there is surface flicker in the image acquired from the first pixel group.

Also, the flicker detection section (the horizontal available pixel brightness value averaging section 61, the brightness comparison section 73 and the primary storage memory 72) detects flicker frequency of the light source based on number of flicker frames occurring periodically. The flicker detection section then compares readout period of an image made up of the first pixel group from system 1 and the detected flicker frequency of the light source to determine whether or not line flicker is occurring with an image acquired from the first pixel group. The flicker correction section (correction calculation section 82) carries out brightness gain correction within a frame for brightness output of image signals of each frame that have been read out from the first pixel group arranged corresponding to an image that has been read out using the second pixel group from system 2, when it has been determined, using determination of the flicker detection section, that there is line flicker in the image acquired from the first pixel group.

In this way, with this embodiment, readout of image data of system 1 from the image sensor 1 is carried out. In this case, at the time of shooting a movie or at the time of acquiring an image for live view display, readout of image data is carried out in synchronism with a shooting frame rate. On the other hand, readout of image data of system 2 from the image sensor 1 is carried out at a faster rate than the readout frame rate for system 1. Read out operation at this time will now be described using the timing chart shown in FIG. 6.

FIG. 6 is a timing chart showing image data readout timing for system 1 and system 2 of the image sensor 1. (a) at the uppermost part of FIG. 6 shows timing for an externally input vertical synchronization signal, while (b) below that shows a vertical synchronization signal for system 1. (c) shows image data output from system 1. Image data of system 1 is for images of respective single frames in periods t10-t20, t20-t30, t30-t40, . . . .

Also, (d) in FIG. 6 shows a vertical synchronization signal for system 2. (e) shows image data output from system 2. Image data of system 2 is for images of respective single frames in periods t10-t11, t11-t12, t12-t13, . . . . Accordingly, with the example shown in FIG. 6, during readout of image data for a single frame from system 1 image data of four frames is read out from system 2. Reading out an integer multiple number of frames from system 2 during readout of a single frame of image data from system 1 is preferred in order to simplify image processing.

At the time of flicker correction, first a brightness average value of horizontal lines and a brightness average value of vertical lines are compared using image data from system 2 showing in (e) at the bottom of FIG. 6. Specifically, brightness average values of horizontal lines of a read-out image are compared at the top and bottom of a screen, and if the top and bottom are different it is possible to detect that line flicker is occurring.

Also, the horizontal available line brightness value averaging section 62 performs averaging for average values of each read out line to calculate a brightness average value (surface average brightness) of the entire screen for each single frame. Comparison is carried out every frame period for surface average brightness values of every calculated frame, and if there is variation it can be detected that surface flicker occurs.

The line brightness correction gain calculating section 73 calculates correction data, such as correction gain amount for line flicker, from average brightness value of each detected line. When calculating this correction data, with one example, correction data such as correction gain amount is calculated with average brightness value of each detected line as a reference. However, this example is not limiting, and it is also possible to calculate correction gain amount with maximum brightness value or minimum brightness value accompanying flicker as a reference, besides average brightness value.

Information such as correction gain amount for line flicker that has been calculated by the line brightness correction gain calculating section 73 described above is output to the line address conversion section 74. In the line address conversion section 74, the above described correction gain amount for line flicker and corresponding line address information for system 1 are added, so as to correspond to a line address of an image of system 1, and information is conveyed to the correction value gain adjustment section 81.

In the correction value gain adjustment section 81, a value to be used for gain correction of image output of system 1 is calculated using interpolation calculation, based on the correction gain amount for line flicker that has been conveyed from the line address conversion section 74 and corresponding line address information of system 1. This interpolation method is linear interpolation of time variation of light and dark flicker, or the performing of calculation of correction values using approximation with an approximate curve (for example, Lagrange interpolation etc.), based on a flicker waveform (brightness variation of a full-wave rectified alternating waveform) for illumination such as a light bulb constituting a light source.

Next, a flicker correction operation of this embodiment will be described using the flowcharts shown in FIG. 7A to FIG. 10. These flowcharts are executed by the CPU 21 controlling each section in accordance with programs stored in memory (not shown).

If a power supply of the camera is turned on (S1), operation commences. Once the camera has commenced operation, first a frame rate initialization operation is executed (S3). Here image data is read out from the image sensor 1. In this case, read out of image data is carried out from system 2 at a high frame rate. With the example shown in FIG. 6, if a single frame is read out from system 1, then image data of four frames is read out from system 2.

If readout at the frame rate has been carried out, next an average brightness for each frame is calculated (S5). Here, the horizontal available pixel brightness value averaging section 61 calculates an average brightness value for each frame of an acquired high speed frame image.

Once calculation of average brightness value has been carried out, next detection of frame flicker period is carried out (S7). Here, a period of brightness variation (flicker) for each frame is detected using the average brightness value of the high-speed frame image that was acquired in step S5. Specifically, flicker frequency of light source flicker is detected using variation period of average brightness of each frame image. As the flicker frequency, for example, in the case of lighting a florescent lamp for a commercial frequency of 60 Hz, flicker period of each frame image is twice the commercial frequency, that is, at a repeating frequency of 120 Hz.

If frame flicker period has been detected, next a movie frame rate is determined (S9). Here, read out frame rate for lines (called a main stream) of system 1 of the image sensor 1 is determined based on flicker frequency of light source flicker that was detected in step S7. Specifically, a frame rate for reading out of system 1 is set to a frame rate that is synchronized to the flicker frequency of light source flicker that was detected in step S7. If readout frame rate for system 1 is made f1 (fps) and detected flicker frequency of light source flicker is made fr (fps), then the frame rate is set to a frame rate having a relationship f1=fr/n (n is an integer).

Once the frame rate has been set in step S9, then a subroutine for a movie information stream operation is executed as interval interrupt processing at a specified period. Detailed operation of this movie information stream operation will be described later date using FIG. 9A and FIG. 9B.

Next, a live view operation is commenced (S11). Here, image data is acquired from system 1 of the image sensor 1 at the frame rate f1 that was set in step S9, and subjected to live view display on the display device 52.

Once live view has been commenced, next a flicker correction operation is carried out (S12). Here, flicker of an acquired image is detected in real time during acquisition of the live view image, and brightness fluctuation due to flicker is corrected. Detailed operation of this flicker correction will be described later using FIG. 8.

Once the flicker correction operation has been carried out, it is next determined whether or not a movie record button (not shown) has been pressed down (S13). If the photographer determines a time at which to start shooting a movie while looking at the live view display, the movie record button is pressed down. In this step, therefore, it is determined whether or not the movie record button has been pressed down.

If the result of determination in step S13 was that the movie record button was not pressed down, it is next determined whether or not a still picture record button (not shown) has been pressed down. If the photographer determines a time at which to start still picture shooting while looking at the live view display, the still picture record button (also called the shutter button) is pressed down. In this step, therefore, it is determined whether or not the still picture record button has been pressed down. If the result of this determination is that the still picture record button has not been pressed down processing returns to step S11 and live view display is updated.

If the result of determination in step S15 was that the still picture record button had been pressed down, a still picture shooting interrupt operation is commenced (S17). Here, an interrupt operation to stop the live view display operation and movie information streaming operation and commence still picture shooting is issued. If this interrupt operation is issued, still picture shooting is executed. In order to carry out still picture shooting, a subject image that to be formed on the image sensor 1 is exposed. Still picture shooting data is read out from either system 1 or system 2 of the image sensor 1. Exposure time (corresponding to shutter speed) is determined from an AE calculation result that has been obtained with the movie information stream (S100), and an exposure operation is carried out for this exposure time.

Once the exposure time has elapsed, still picture data readout is carried out, and it is determined whether or not readout of still picture data has been completed (S19). If readout of a still picture has been completed a still picture data readout completion flag representing an internal processing state is set, and so determination is based on this completion flag. In a state where this completion flag has not been set, the determination operation of step S19 continues.

If the result of determination in step S13 is that the movie record button has been pressed down, there is a transition to processing for movie shooting. First, a movie shooting interrupt is commenced (S31). Here, as internal processing, a state where movie shooting recording is commenced, namely movie interrupt issuance, is set.

Next, there is a change to operating conditions for movie main stream recording (S33). Here, an imaging operation of the image sensor 1 is changed and set to be at the time of a movie shooting operation. Frame rate at the time of movie shooting is made a frame rate that has been set in step S9, a frame rate that has been set by the photographer on a menu screen or the like, or a frame rate that is automatically set by the camera at the time of movie shooting. Image data is read out from system 1 of the image sensor 1 at the frame rate that has been set. The movie main stream is also called readout of images that have been acquired from the first pixel group of the image sensor 1.

Next a flicker correction operation is carried out (S34). In step S33, the frame rate for reading out from system 2 of the image sensor 1 is set the same as or faster than the frame rate for reading out from system 1. Correction gain amount for flicker correction is calculated using this image data read out from system 2. Further, flicker correction is carried out on image data read out from system 1 in accordance with a conversion address. This operation in step S34 is the same as the operation in step S12, and detailed operation of the flicker correction operation will be described later using FIG. 8.

Once the flicker correction operation has been carried out, next image processing for movie recording is carried out (S35). Here, data compression and encoding processing is carried out so that read out data for movie recording that has been output from system 1 and subjected to flicker correction processing in the flicker correction operation (S34) corresponds to a movie recording format.

Once the image processing for movie record has been carried out, it is next determined whether or not a movie record completion button has been pressed or if a specified time has elapsed (S37). It is determined whether or not a movie record completion button for designating movie record completion has been pressed down, or a previously designated storage time has elapsed. If the result of determination processing in step S37 is No, processing returns to step S34 and movie shooting continues together with flicker correction being carried out.

If the result of determination processing in step S37 is Yes, a data readout completion flag is issued (S38). Here, a completion flag for setting a movie data read completion state is set.

Once the completion flag has been set in step S38, or if the result of determination in step S19 is still picture data read complete, it is determined whether or not a power supply off button (not shown) has been pressed down (S39). Here it is determined whether or not a power supply off button for turning a power supply off has been pressed down. If the result of this determination is that the power supply off button has not been pressed down, processing returns to step S11. On the other hand, if the power supply off button has been pressed down there is a transition to power supply off processing, a power supply off state is entered (S40), and camera operation is terminated.

Figure 8:
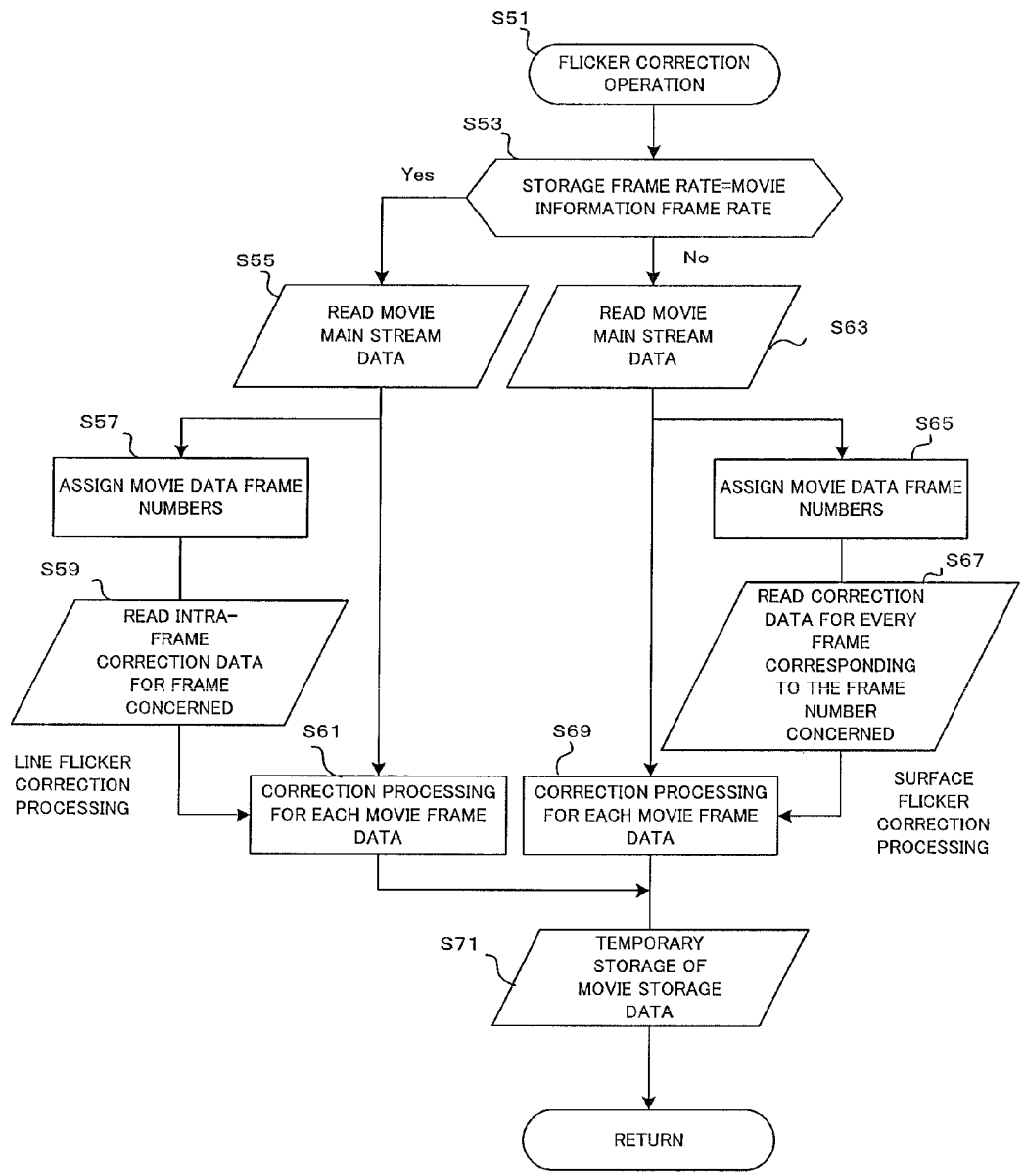
FIG. 8 is a flowchart showing a flicker correction operation of the camera of one embodiment of the present invention.

Next, detailed operation of the flicker correction operation of step S34 will be described using the flowcharts shown in FIG. 8. If the flow for the flicker correction operation is entered (S51), it is first determined whether or not the storage frame rate and the movie information frame rate are equal (S53). Here, the storage frame rate is a frame rate for image data read out from system 1 of the image sensor 1, while the movie information frame rate is the frame rate of image data read out from system 2 of the image sensor 1. Image data read out from system 1 includes recorded images at the time of movie shooting, and display images for live view display, as was described previously.

If the result of determination in step S53 is that the storage frame rate and movie information frame rate match, there is a possibility of so-called line flicker occurring, where light and dark portions arise within each frame of the movie image. Therefore, correction processing for line flicker is carried out in step S55 and after.

When carrying out line flicker correction processing, first reading of movie main stream data is carried out (S55). Here, movie images are periodically read out from system 1 of the image sensor 1 at a set frame rate.

Next, frame numbers are assigned to movie data (S57). Here, frame numbers are assigned to image data that has been read out from system 1 of the image sensor 1 so that each of the frames of the movie image are arranged in order.

Once frame numbers have been assigned to the movie data, next readout of intra-frame correction data for the frame is read out (S59). Here, reading of correction data, such as correction gain amount that was calculated in the line brightness correction gain calculation section 73 and line addresses that have been converted by the line address conversion section 74, is performed. This correction data for line flicker correction may be temporarily stored in buffer memory once it has been calculated for each frame, and read out from the memory.

Once reading of correction data has been carried out, next correction processing for each frame data of the movie is carried out (S61). Here, in step S59 the correction calculation section 82 (refer to FIG. 5) carries out line flicker correction on the image data of system 1 that has been read out in step S55, using correction data that has been read. Specifically, line flicker correction is carried out on image data of line addresses that have been obtained by the line address conversion section 74, using correction value and gain adjusted value appropriate for images of system 1 as correction gain amount that has been calculated by the line brightness correction gain calculating section 73, so that brightness within each frame image becomes uniform.

If the result of determination in step S53 is that the storage frame rate and movie information frame rate do not match, there is a possibility of so-called surface flicker occurring, where light and dark portions arise for each frame of the movie image. Therefore, correction processing for surface flicker is carried out in step S63 and after.

When carrying out surface flicker correction processing, first reading of movie main stream data is carried out (S63). Here, similarly to step S55, movie images are periodically read out from system 1 of the image sensor 1 at a set frame rate.

Next, frame numbers are assigned to movie data (S5). Here, similarly to step S57, frame numbers are assigned to image data that has been read out from system 1 of the image sensor 1 so that each of the frames of the movie image are arranged in order.

Once frame numbers have been assigned to the movie data, next readout of correction data for every frame corresponding to the frame numbers is read out (S67). Here, read out of correction data such as the correction gain amount that was calculated in the frame brightness correction gain calculation section 65 is performed. This correction data corrects surface flicker based on average brightness of every frame. This correction data for surface flicker correction may be temporarily stored in buffer memory once it has been calculated for each frame, and read out from this buffer memory.

Once reading of correction data has been carried out, next correction processing for each frame data of the movie is carried out (S69). Here, in step S67 the correction calculation section 82 (refer to FIG. 5) carries out surface flicker correction on the image data of system 1 that has been read out in step S63, using correction data that has been read. Specifically, brightness correction is carried out on all images of each frame, using correction data for every frame that has been read out in step S67, so that average brightness becomes uniform in each frame.

Once processing for line flicker correction or surface flicker correction has been carried out in step S61 or step S69, next temporary storage of movie storage data is carried out (S71). Here, image data for a movie that was subjected to flicker correction in step S61 or S69 is temporarily stored. At the time of live view display, a live view image is displayed based on this temporary stored image data (S11 in FIG. 7A). Also, at the time of movie shooting, image data for storage is generated using the temporarily stored image data, and stored (S35 in FIG. 7B). Once temporary storage of data has been carried out, the flicker correction operation is terminated and the originating processing flow is returned to.

In this way, in this flow line flicker correction (S55-S61) or surface flicker correction (S63-S69) is carried out based on the results of comparing storage frame rate and movie information frame rate (S53). Depending on the light emission waveform of the light source, there maybe be cases where line flicker occurs within surface flicker, even in cases where the storage frame rate and the movie information frame rate do not match. In such a situation, the line brightness correction gain calculating section 73 and the frame brightness correction gain calculating section 65 are operated simultaneously, regardless of the determination in step S53. Next, appropriate correction is made possible by combining the intra-frame correction data that was readout in step S59 and the correction data for every frame that was read out in step S67 in the correction value gain adjustment section 81. Combination processing in this case involves multiplying the intra-frame correction data that was readout in step S59 and the correction date for every frame that was read out in step S67, and fine-tuning of gain correction for correction data after multiplication that applied uniform minus correction to all images so that images do not white-out.

Figure 9A:
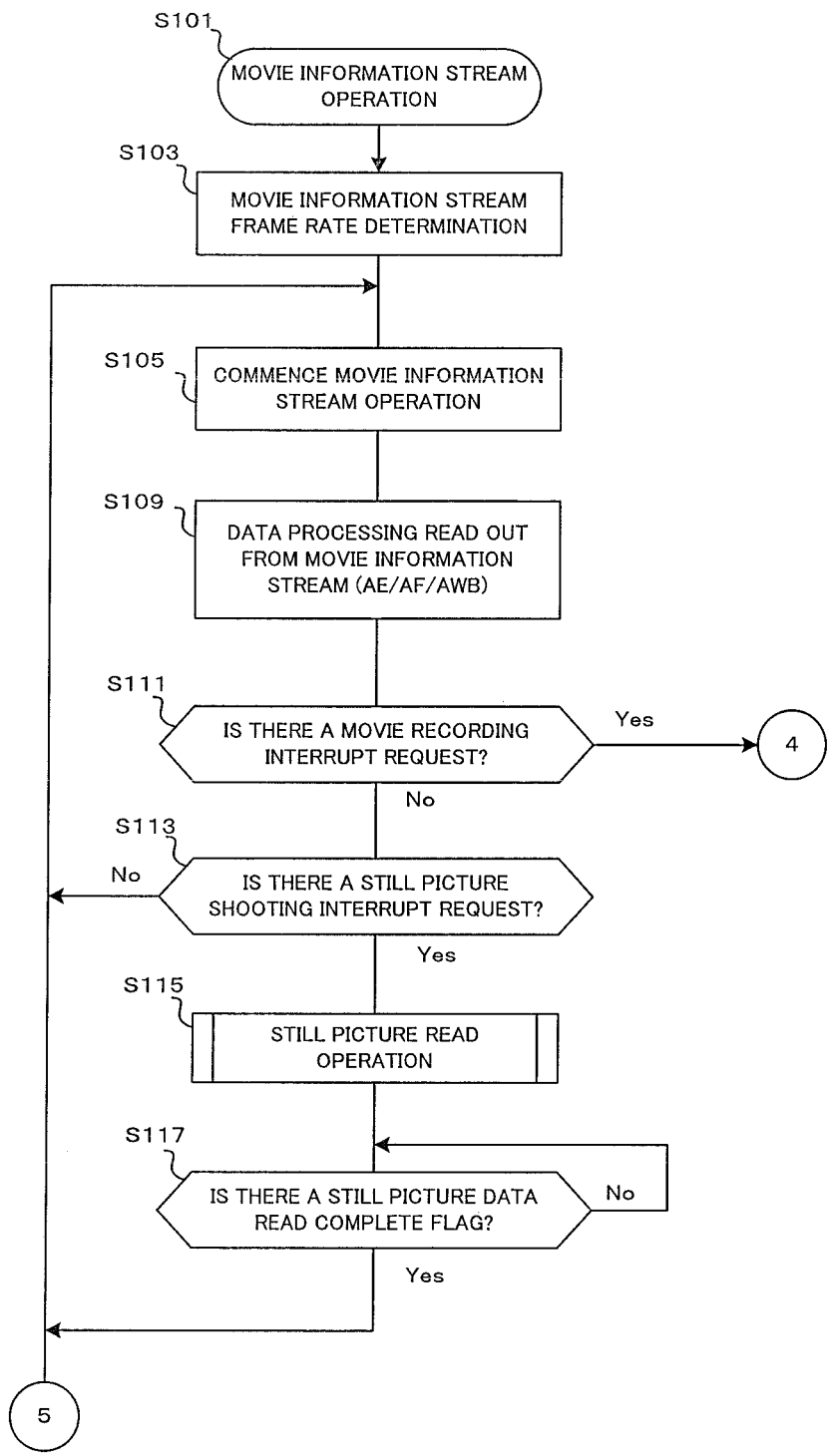
FIG. 9A and FIG. 9B are flowcharts showing a movie information streaming operation of the camera of one embodiment of the present invention.
Figure 9B:
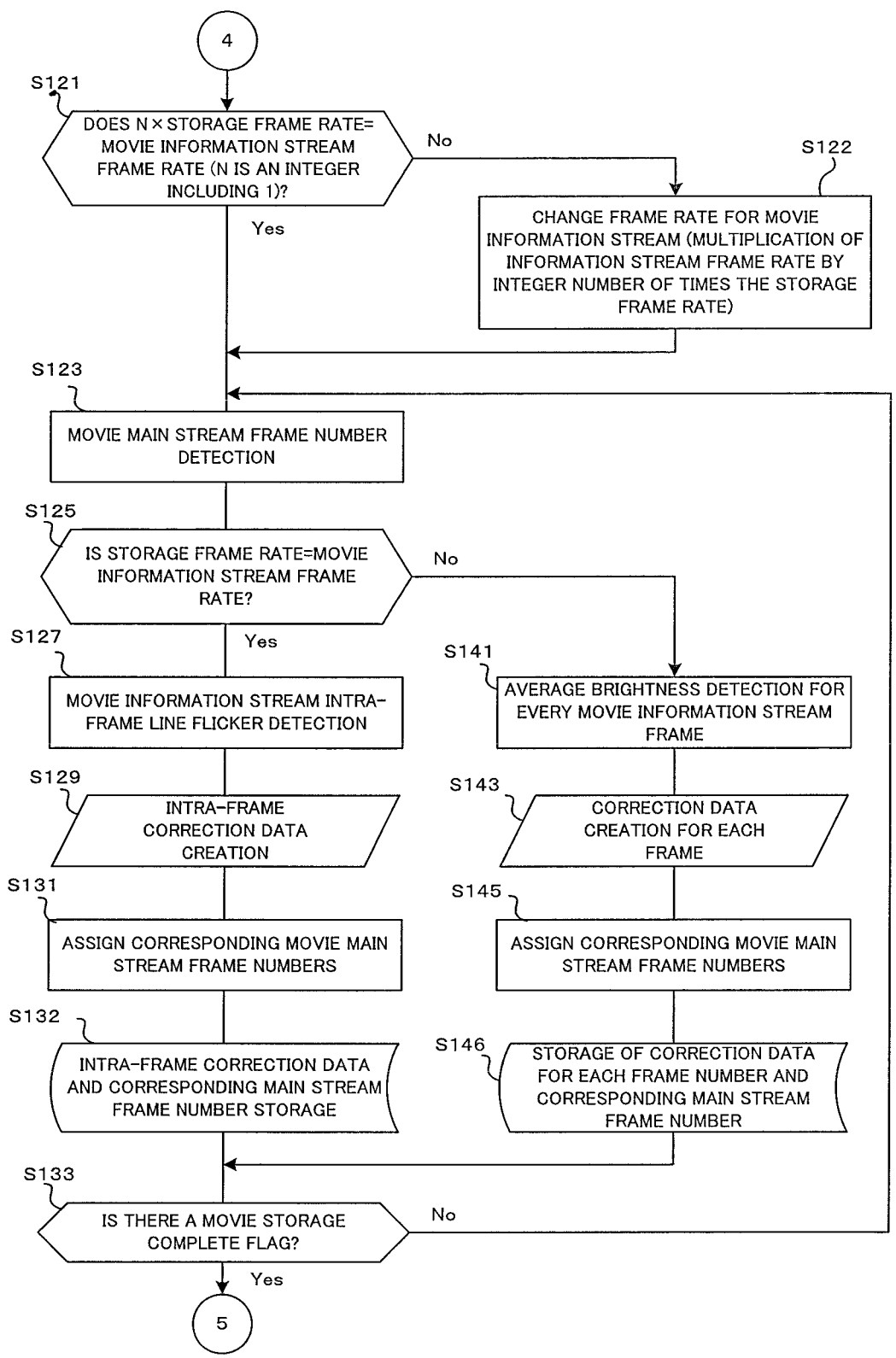

Next, detailed operation of movie information streaming processing in step 100 will be described using the flowcharts shown in FIG. 9A and FIG. 9B. This movie information stream processing is a processing routine that is called as task processing (interval task processing) implemented every specified period, and is executed after execution of step S9 (before live view display, refer to FIG. 7). As was described previously, respective flicker correction is carried out either in step S12 during live view display or in step S34 during movie shooting. This movie information stream processing creates correction data for carrying out flicker correction.

Once the movie information stream operation has been commenced (S101), first a frame rate for the movie information stream is determined (S103). Here, a frame rate for reading out from system 2 of the image sensor 1 is determined. The frame rate f2 of this movie information stream is a frame rate that is a integer number of times the movie main stream frame rate for reading out from system 1 of the image sensor 1.

Once the movie information stream rate has been determined, next operation for movie information stream is commenced (S105). Here, image data is read out from system 2 of the image sensor 1 at the frame rate for the movie information stream that was set in step S103.

Once the movie information stream operation has commenced in step 105, next data processing that has been read out from the movie information stream is carried out (S109). Here, a focus state exposure state and color temperature state are detected using image data that has been read out from system 2 of the image sensor 1. Focus state can be detected by acquiring contrast information of an image using image data from system 2. A focus lens within the photographing lens 11 is then driven so that this acquired contrast information becomes maximum. Automatic focus adjustment (AF) using a so-called contrast detection method is carried out based on the focus state.

Also, exposure state is a brightness state of image data when forming an image using the image sensor 1. This exposure state involves first detecting subject brightness based on image data relating to system 2. Aperture opening amount of an optical system and sensitivity (gain) of the image sensor 1 are then adjusted based on this subject brightness so as to achieve an optimum exposure state for the taken image. Automatic exposure control (AE) is carried out based on the exposure state.

Color temperature state indicates a state of output balance of three primary color signals that are output from the image sensor 1. This involves detection of correct temperature state of a taken image based on image data relating to system 2, and adjusting output balance of three primary colors of the image sensor 1 so that the taken image has an optimum color temperature. Adjustment of output balance for the three primary colors is also called white balance adjustment. This adjustment is also carried out as automatic white balance (AWB) etc. for sequentially adjusting to a target color temperature state based on an arbitrary color temperature state that has been detected using image data that was acquired from the subject image.

Once data processing that has been readout from the movie information stream has been carried out, it is next determined whether or not there is a movie record interrupt request (S111). If the photographer commences movie shooting, the movie record button is pressed down and a movie interrupt request is generated at this time. In this step it is determined whether or not this movie interrupt request has been generated.

If the result of determination in step S111 is that there is not a movie record interrupt request, it is next determined whether or not there has been a still picture shooting interrupt request (S113). If the photographer carries out shooting of a still picture the still picture shooting button (also called the shutter release button) is pressed down and a still picture shooting interrupt request is generated at this time. In this step it is determined whether or not this still picture interrupt request has been generated. If the result of this determination is that a still picture shooting interrupt request has not been generated, processing returns to step S105.

On the other hand, if the result of determination in step S113 is that a still picture shooting interrupt request has been generated, a still picture read operation is executed (S115). Here, still picture image data is acquired using image data from all pixels of the image sensor 1. Detailed operation of this still picture reading operation will be described later using FIG. 10.

It is next determined whether or not there is a still picture data read completion flag (S117). The interrupt processing operation of step S115 is executed, and here it is determined whether or not this interrupt processing operation has been completed. If the result of this determination is that the processing has not been completed, processing returns to step S117 where completion is awaited. On the other hand, if the result of determination is that the interrupt processing has been completed, processing returns to step S105.

If the result of determination in step S111 is that there is a movie record interrupt request, it is next determined whether or not N×the storage frame rate matches the movie information stream frame rate (S121). Here, it is determined whether or not an integer (integer N=1, 2 3, 4 . . . ) times the storage frame rate at the time of movie shooting (frame rate in the case of reading out from system 1 of the image sensor 1) matches the movie information stream frame rate (frame rate when reading out from system 2 of the image sensor 1. Specifically, it is determined whether or not the storage frame rate at the time of movie shooting and the movie information stream frame rate are synchronized.

If the result of determination in step S121 was No, namely that N×the storage frame rate does not match the movie information stream frame rate, the frame rate is changed so as to be synchronized to the storage frame rate at the time of movie shooting (S122). Here, the frame rate of the movie information stream is changed so as to become an integer times the storage frame rate.

If the result of determination in step S121 was Yes, or if frame rate for the movie information stream was changed in step S122, next a movie main stream frame number is detected (S123). Here, a movie main stream frame number for each frame image that has been sequentially taken in time sequence in the video main stream is detected, in the corresponding time sequence.

Once detection of movie main stream frame number has been carried out, it is next determined whether or not the storage frame rate and the video information stream frame rate match (S125). Here, it is determined whether or not the storage frame rate for reading out from system 1 of the image sensor 1 at the time of movie shooting matches the movie information stream frame rate for reading out from system 2 of the image sensor 1.

If the result of determination in step S125 is Yes (namely that the storage frame rate and the movie information stream frame rate match), then each frame image from system 2 for reading images as a movie information stream frame enters a so-called line flicker state where light and dark portions arise in a single frame due to flicker of the light source. Correction data for line flicker correction is therefore generated in steps S127-S132. At the time of this line flicker correction, bright and dark difference information due to line flicker within each frame image and positional information as to where light and dark portions occur are detected from the movie information stream, and these items of information are stored in step S132. In steps S12 and S34, line flicker correction is carried out for taken images read out from system 1 of the image sensor 1, based on the stored items of information.

First, line flicker detection for within the movie information stream frame is carried out (S127). Here, positions where line flicker occurs and differences in light and dark within a single frame of an image are detected by the brightness comparison section 71 (refer to FIG. 5).

Once line flicker detection has been carried out in step S127, next creation of intra-frame correction data is carried out (S129). Here, brightness correction data for correcting brightness variations due to line flicker within each frame (such as average brightness and difference in brightness value between peak/bottom respectively corresponding to read addresses, address of position where brightness peak occurs, brightness correction gain amount etc.) is created by the line brightness correction gain calculating section 73 etc. based on line flicker information that has been detected in step S127.

Once the intra-frame correction data has been created, frame numbers for the corresponding movie main stream are appended (S131). Here, frame numbers are appended to frame images (image data from system 1) that have been acquired by the corresponding movie main stream, using the intra-frame correction data that was created in step S129.

Next, storage of the intra-frame correction data and corresponding main stream frame numbers is carried out (S132). Here, information on the intra-frame correction data that was created in step S129 and information on corresponding movie main stream frame numbers that was created in step S131 are stored in buffer memory (not shown).

If the result of determination in previously described step S125 was that the storage frame rate and the movie information stream frame rate do not match, image data acquired by the movie information stream (image data from system 1) is in a state where there is no difference in light and dark portions within a single frame due to flicker of the light source. Specifically, average brightness of each frame image that has been acquired in time series is in a so-called surface flicker state, continuously changing at the flicker period of the light source. Correction data for surface flicker correction is therefore generated in steps S141-S147.

First, average brightness for each movie information stream frame is detected (S141). Here, the frame brightness average value flicker period determination section 64 (refer to FIG. 5) detects surface average brightness for each frame image based on the video information stream (image data from system 2). Then, differences in average brightness of a frame, constituted by peak/bottom (maximum brightness/minimum brightness) for average brightness of each frame, and frame information for the occurrence of light and dark in time series (corresponding frame numbers), are detected.

Next, correction data is created for every frame number (S143). Here, the frame brightness correction gain calculation section 65 (refer to FIG. 5) calculates brightness correction data for every frame corresponding to frame images acquired in time series (acquired from system 1) based on surface flicker information that was detected in step S141, to create correction data.

Once the correction data has been created, frame numbers for the corresponding movie main stream are appended (S145). Here, frame numbers are appended to the correction data that was created in step S143.

Next, the correction data for every frame number and corresponding main stream frame numbers are stored (S146). Here, correction data for every frame number that was created in step S143, and information on movie main stream frame numbers that was processed in step S145, are stored in buffer memory (not shown).

Once storage has been carried out in step S132 or step S146, it is next determined whether or not there is a movie record completion flag (S133). In the event that the photographer has completed movie shooting, movie shooting is completed if the movie record completion button is pressed down. Movie recording is also completed if a specified time has elapsed. If movie recording is completed, then since the movie record completion flag is issued in this step determination is based on presence or absence of the movie recording completion flag. If the result of this determination is that there is not a movie recording completion flag processing returns to step S123, while on the other hand if there is a movie recording completion flag processing returns to S105.

In this way, the movie information stream operation is executed every specified period. With this subroutine, correction data used for carrying out a flicker correction operation is created and temporarily stored.

Figure 10:
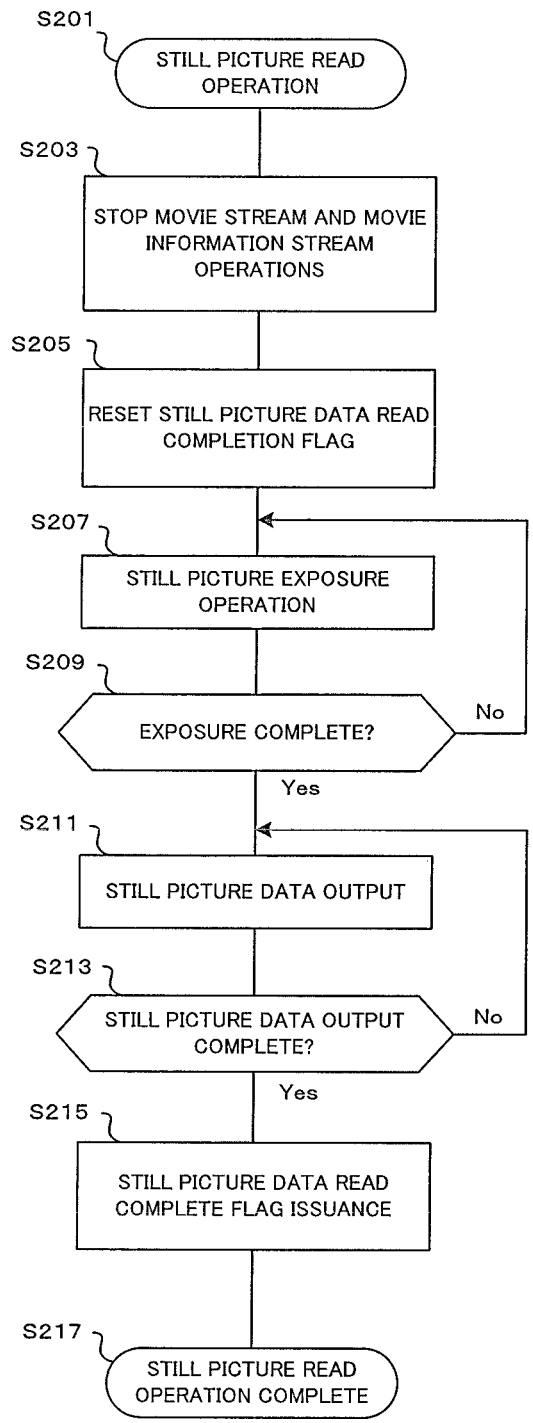
FIG. 10 is a flowchart showing a still image readout operation of the camera of one embodiment of the present invention.

Next, detailed operation of the still picture interrupt operation of step S115 (refer to FIG. 9A) will be described using the flowchart shown in FIG. 10. As described previously, a still picture read operation executes a still picture interrupt operation in step S115 if a still picture shooting interrupt operation is commenced in step S17 (referred to FIG. 7) and a flag is generated.

If a still picture interrupt operation has commenced (S201), first a movie stream and movie information stream operation are stopped (S203). Here, readout of image data from both system 1 and system 2 of the image sensor 1 is stopped.

Next, a still picture data read completion flag is reset (S205). Here, a still picture data read completion flag, which is a flag indicating that still picture data reading is complete, is reset.

Once reset of the still picture data read completion flag has been carried out, next a still picture exposure operation is carried out (S207). Here, a still picture exposure operation is carried out. Specifically, each pixel of the image sensor 1 is reset, a subject image is exposed on the image sensor 1 at a predetermined aperture value and for a predetermined exposure time (shutter speed), and photoelectric conversion current is accumulated on each pixel.

Next, it is determined whether or not exposure is complete (S209). Here, it is determined whether or not the exposure time has elapsed, and until the exposure time has elapsed the exposure operation continues. On the other hand, if the exposure time has elapsed exposure is completed.

If the result of determination in step S209 is that exposure is complete, next output of still picture data is carried out (S211). Here, image data is output based on the photoelectric conversion current that has accumulated as a result of the exposure operation, and stored in memory. It is next determined whether or not still picture data output is complete (S213). If the result of determination in step S213 is that data output is not complete, processing returns to step S211.

If the result of determination in step S213 is that still picture data output has been completed, the still picture data read completion flag is issued (S215). Here, the still picture read completion flag that was reset in step S205 is issued. If the completion flag has been issued the still picture read operation is concluded (S217).

As has been described above, with one embodiment of the present invention, in the event that image data has been output by means of at least two systems, namely system 1 and system 2 of the image sensor 1, image data from system 1 is used as image data for live view display and for movie shooting. Flicker detection is then carried out using image data from system 2, and flicker correction is carried out on image data from system 1 using the results of this detection. As a result, even with a movie of our high frame rate, such as from a high-speed camera, or with the movie for which a frame rate is variable, it becomes possible to correct flicker appropriately and in real time Also, with the one embodiment of the present invention it is possible to detect line flicker and surface flicker. As a result, even in cases where light and dark portions occur within the screen, and in cases where light and dark portions occur on a screen in time series, it is possible to remove bright and dark differences to give an image that does not appear strange.

With the one embodiment of the present invention, flicker correction is applied to both live view display and movie shooting. However, this is not limiting, and it is also possible to carry out flicker correction on only one of either live view display or movie shooting. It is also possible to apply correction to both surface flicker and line flicker. However, this is not limiting, and it is also possible to carry out flicker correction on only one of either surface flicker or line flicker.

Also, this embodiment has been described using a digital camera as a device for imaging. However, it is also possible to use a digital single lens reflex camera or a compact digital camera as a camera. It is also possible to use a camera for shooting movies, such as a video camera etc. Further, the present invention can be applied to a camera that is built into a mobile phone, Smart phone, PDA (personal digital assistant), personal computer (PC), tablet type computer or game console etc. It is possible to apply the present invention to an imaging device as long as it is capable of carrying out reading of images with a plurality of systems.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an image sensor, having a plurality of pixels comprising a first pixel group and a second pixel group arranged in a two dimensional array, and a plurality of A/D converters for simultaneous and parallel conversion of output signals that have been respectively formed by pixels corresponding to the first pixel group and the second pixel group to respective digital signals;
   an image signal readout section for respectively independently reading out image signals from pixels corresponding to the first pixel group and the second pixel group of the image sensor;
   a flicker detection section for subjecting a subject image that has been formed on the image sensor to photoelectric conversion based on a periodic flicker action of the light source included in the subject, and detecting flicker period of the light source by detecting bright states and dark states of an entire taken image from image output corresponding to pixels corresponding to the second pixel group; and
   a flicker correction section for, when, in the flicker detection section, an image that has been acquired using pixels corresponding to the second pixel group has light of a bright state and a dark state incident as a result of periodic flicker, making brightness output of a taken image using the first pixel group arranged in correspondence with the second pixel group become a standard brightness output, and correcting brightness output gain corresponding to each pixel of a plurality of pixels corresponding to the first pixel group.

2. The imaging device of claim 1, wherein:
the image signal readout section reads out image signals of the second pixel group within a readout period for image signals of one frame of the first pixel group;
the flicker detection section detects flicker frequency of the light source based on a number of flicker frames that occur periodically, using image signals of the second pixel group; and
the flicker correction section carries out gain correction of image signals for the first pixel group that have been read out within a period that includes the readout period for the second pixel group.

3. The imaging device of claim 2, wherein:
the flicker detection section further comprises a flicker determination section for determining a flicker state that is occurring in acquired images from the first pixel group;
the flicker determination section determines whether or not surface flicker is occurring in acquired images from the first pixel group by detecting flicker frequency of a light source based on number of flicker frames that occur periodically, and comparing a readout period of images composed of the first pixel group with the detected flicker frequency of the light source; and
the flicker correction section, in the event that it is determined as a result of determination by the flicker determination section that there is surface flicker in acquired images from the first pixel group, carries out unified gain correction on brightness output of image signals that have been read out from the first pixel group in a time corresponding to images that have been read out from the second pixel group.

4. The imaging device of claim 2, wherein:
the flicker detection section further comprises a flicker determination section for determining a flicker state that is occurring in acquired images from the first pixel group;
the flicker determination section determines whether or not line flicker is occurring in acquired images from the first pixel group by detecting flicker frequency of a light source based on number of flicker frames that occur periodically, and comparing a readout period of images composed of the first pixel group with the detected flicker frequency of the light source; and
the flicker correction section, in the event that it is determined as a result of determination by the flicker determination section that line flicker is occurring in acquired images from the first pixel group, carries out brightness gain correction within the frame, on brightness output of each frame image signal that has been read out from the first pixel group, arranged corresponding to images that have been read out using the second pixel group.

5. The imaging device of claim 2, wherein:
the image signal readout section further comprises a frame rate setting section for setting frequency of reading out image signals from pixels corresponding to the first pixel group and the second pixel group of the image sensor; and
the frame rate setting section sets frame rates, that are frequencies for reading out respective image signals from pixels corresponding to the first pixel group and the second pixel group of the image sensor, to frame rates that are respectively different readout frequencies for at the time of movie shooting and at the time of live view display, and sets respective frame rates for at the time of movie shooting to frame rates that are faster than respective frame rates at the time of live view display.

6. The imaging device of claim 3, wherein:
the image signal readout section further comprises a frame rate setting section for setting frequency of reading out image signals from pixels corresponding to the first pixel group and the second pixel group of the image sensor; and
the frame rate setting section sets frame rates, that are frequencies for reading out respective image signals from pixels corresponding to the first pixel group and the second pixel group of the image sensor, to frame rates that are respectively different readout frequencies for at the time of movie shooting and at the time of live view display, and sets respective frame rates for at the time of movie shooting to frame rates that are faster than respective frame rates at the time of live view display.

7. The imaging device of claim 4, wherein:
the image signal readout section further comprises a frame rate setting section for setting frequency of reading out image signals from pixels corresponding to the first pixel group and the second pixel group of the image sensor, and
the frame rate setting section sets frame rates, that are frequencies for reading out respective image signals from pixels corresponding to the first pixel group and the second pixel group of the image sensor, to frame rates that are respectively different readout frequencies for at the time of movie shooting and at the time of live view display, and sets respective frame rates for at the time of movie shooting to frame rates that are faster than respective frame rates at the time of live view display.

8. An imaging method for an imaging device, comprising:
a step of respectively independently reading out image signals from pixels corresponding to a first pixel group and a second pixel group, from an image sensor having a plurality of pixels comprising the first pixel group and the second pixel group arranged in a two dimensional array, and a plurality of A/D converters for simultaneous and parallel conversion of output signals that have been respectively formed by pixels corresponding to the first pixel group and the second pixel group to respective digital signals;
a flicker detection step of subjecting a subject image that has been formed on the image sensor to photoelectric conversion based on a periodic flicker action of a light source included in the subject, and detecting flicker period of the light source by detecting bright states and dark states of an entire taken image from image output corresponding to pixels corresponding to the second pixel group; and
a flicker correction step of, when, in the flicker detection step, an image that has been acquired using pixels corresponding to the second pixel group has light of a bright state and a dark state incident as a result of periodic flicker, making brightness output of a taken image using the first pixel group arranged in correspondence with the second pixel group become a standard brightness output, and correcting brightness output gain corresponding to each pixel of a plurality of pixels corresponding to the first pixel group.

* * * * *